United States Patent

[11] 3,596,783

[72] Inventors Donald M De Bower;
Peter M. Warfield, both of Cedar Falls, Iowa
[21] Appl. No. 707
[22] Filed Dec. 5, 1970
[45] Patented Aug. 3, 1971
[73] Assignee Clay Equipment Corporation

[54] AUTOMATIC LOWERING DEVICE FOR SILO UNLOADER
3 Claims, 4 Drawing Figs.
[52] U.S. Cl. ................................................. 214/17 DB
[51] Int. Cl. ................................................. B65g 65/38
[50] Field of Search ........................................ 214/17 CB, 17 DB

[56] References Cited
UNITED STATES PATENTS
3,308,973 3/1967 Heitzman .................. 214/17 DB
3,524,557 8/1970 Bakker ...................... 214/17 DB Primary Examiner—Robert G. Sheridan
Attorney—Norman Lettvin ABSTRACT: An automatic lowering device for a silo unloader. The unloader includes an auger adapted to travel concentrically about a single support cable suspended from the top and center of the silo. the auger extends from the center cable support to the wall of the silo with the outer end of the auger being supported by the silage in the silo. Extending in the opposite direction from the center cable support is a control mechanism. The control mechanism includes a foot which senses the distribution profile of the silage in the silo and operates a limit switch whenever the silage forms a steeply sided cone.

PATENTED AUG 3 1971

Inventors:
Donald M. DeBower
By Peter M. Warfield

Attys.

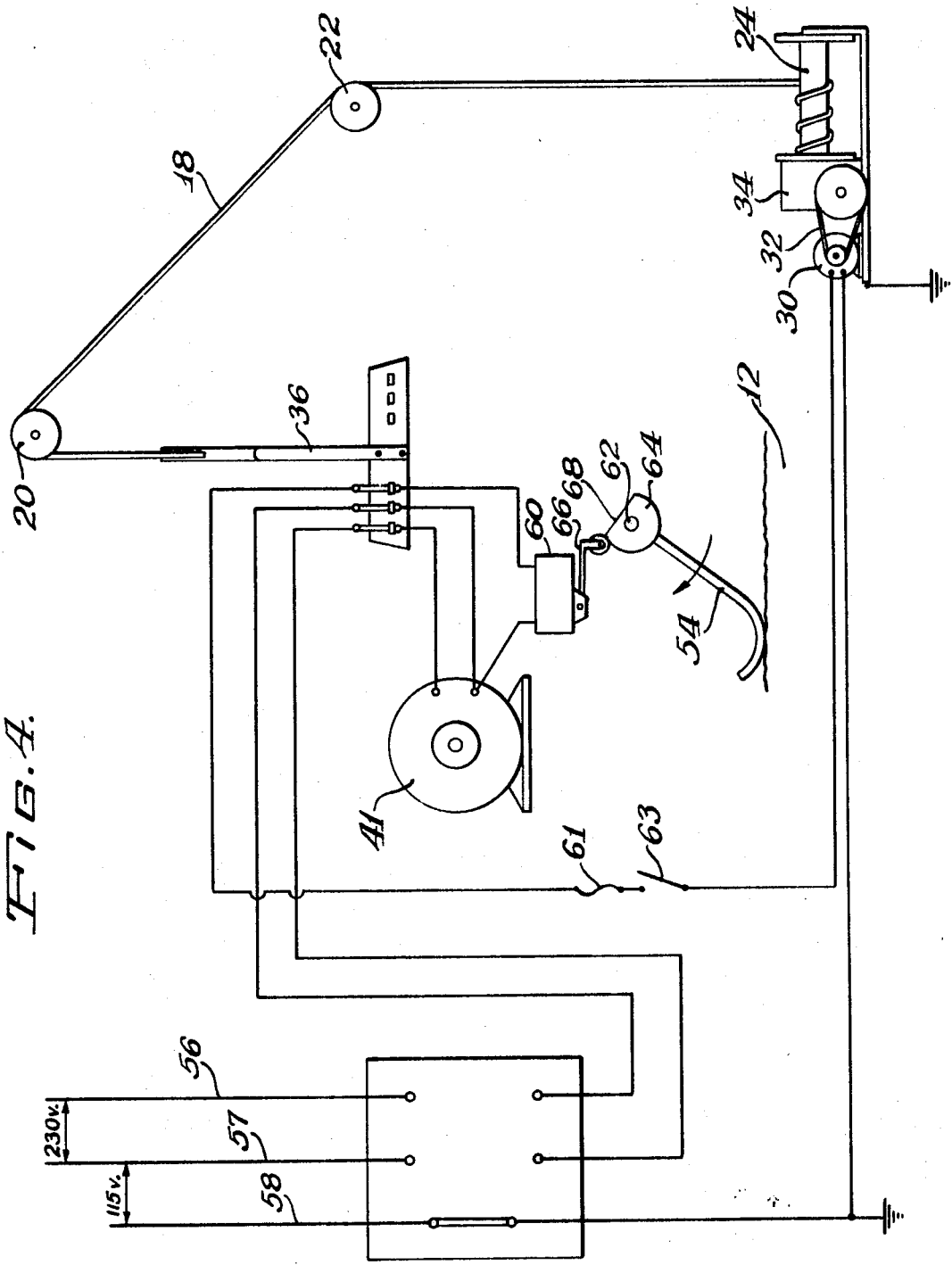

3,596,783

AUTOMATIC LOWERING DEVICE FOR SILO UNLOADER

BACKGROUND OF THE INVENTION

This invention relates to an improved silo unloader and more particularly to a silo unloader adapted to remove material from the top of the stored bulk material in the silo.

Silage for feeding farm animals is generally stored in a cylindrically shaped silo. Removal of the silage from the silo is the subject matter of numerous patents including Heitzman U.S. Pat. No. 3,308,973 and Steffen U.S. Pat. No. 3,438,517. Each of these cited patents are somewhat related to the subject matter of the present invention in that they disclose a switch construction adapted to sense the material profile of the silage or other bulk material in the silo. Heitzman for example shows a mercury switch attached to a bar over a silage auger to sense the level of the bar and, consequently, the level of the auger. This provides an indication of the level of the silage immediately beneath the auger.

Steffen senses the distribution of grain immediately adjacent the outside wall of a silo by means of a vane attached to a limit switch. His arrangement thus provides a means for sensing a small mound of grain distributed adjacent the outside silo wall.

While these particular constructions operate efficiently for the purposes for which they were intended, they are not believed to provide the advantages of applicant's invention. For example, applicant's present invention provides a means for sensing the distribution of silage after the auger or material conveyor has removed a layer of silage from the bulk material. This will be set forth in greater detail below; however, it is important to note that the control mechanism in Heitzman senses only the level of the silage immediately beneath the auger. The level or distribution profile of the silage at this point is normally quite variable being more horizontal at the leading edge of the auger and more cone shaped at the trailing edge of the auger depending upon the coarseness of the silage and how effectively the silage is being removed by the auger. The possible result of this variation is a constant making and breaking of a circuit due to changing the level of the mercury switch. In addition, it is quite likely that the mercury switch, which is exposed directly above the auger, could be damaged and rendered ineffective by silage material driven into the switch by the auger.

Steffen shows a switch which is especially useful for use with a fine grannular bulk material such as grain. This results since Steffen senses a change in the distribution profile of the e silo material only at the outer edge of the auger. Thus, the Steffen device is not nearly so useful for silage which is a coarse material and does not have the same handling and bulk characteristics as grain. It is with these factors in mind that the present invention was devised.

SUMMARY OF THE INVENTION

In a principal aspect the present invention comprises the improvement in a silo unloading device, of the type which includes a bulk material conveyor for conveying bulk material along the top of the stored bulk material, through a central material discharge blower, the conveyor and blower being supported substantially at the center of the silo, of means for sensing the material distribution profile of the bulk material. In particular, a foot extends in the direction radially opposite that of the conveyor means from the central location. The foot engages the bulk material and operates a switch to lower the silo unloader whenever the distribution profile achieves a desired shape.

It is thus an object of the present invention to provide an improved silo unloader device.

It is a further object of the present invention to provide a novel and useful means for determining the distribution profile of the material within a silo and to utilize such sensing means to control the material conveyor means designed for removing material from the silo.

These and other objects, advantages and features of the present invention will be set forth in greater detail in the description which follows.

BRIEF DESCRIPTION OF THE DRAWINGS

In the detailed description which follows, reference will be made to the drawing comprised of the following Figures:

FIG. 4 is an electrical circuit diagram for the silo unloader of the present invention.

DESCRIPTION OF THE PREFERRED EMBODIMENT

Figure 3:
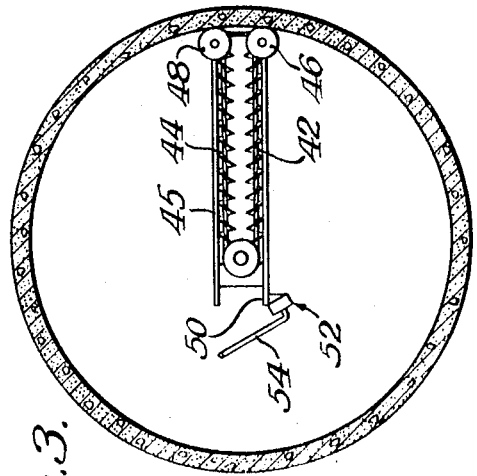
FIG. 3 is a top cross-sectional view of the unloader of the present invention taken substantially along the line 3–3 in FIG. 1.
Figure 1:
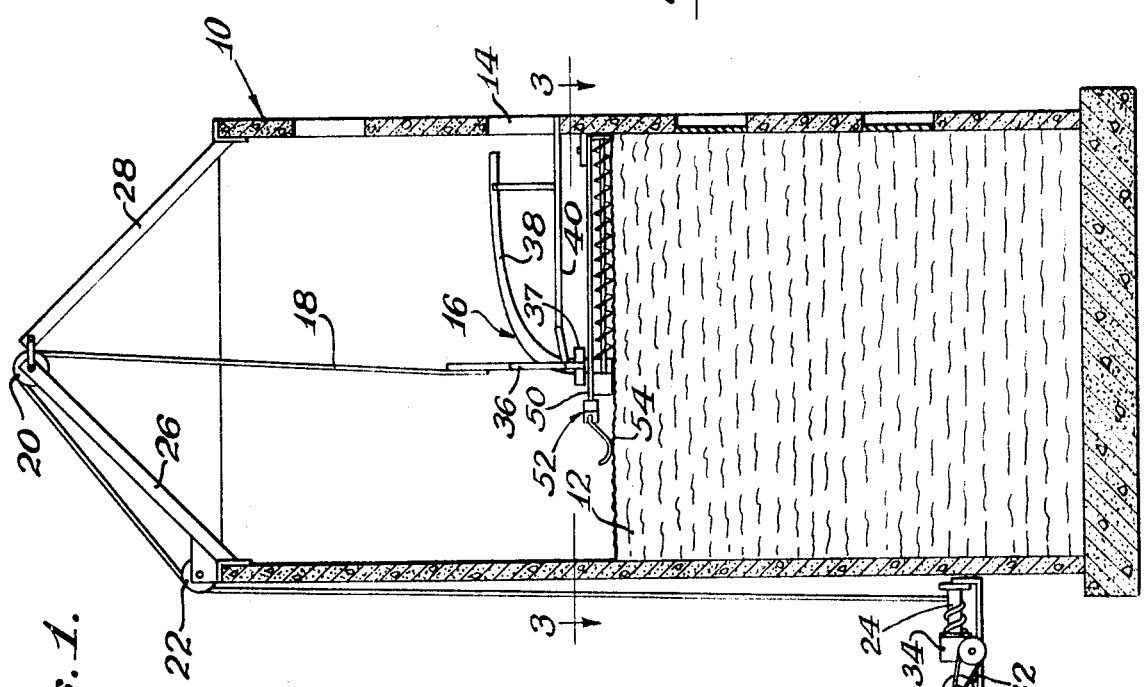
FIG. 1 is a side cross-sectional view of the unloader of the present invention when the material in the silo is distributed to define a substantially horizontal plane.

Referring now to FIGS. 1 and 3, there is shown a typical cylindrically shaped farm silo 10 having located therein bulk material 12 such as silage, grain, or the like. The silo 10 includes a number of discharge openings as at 14 through which the bulk material 12 is discharged as required by a silo unloader 16.

Silo unloaders are in themselves not new. Moreover, silo unloaders of the type illustrated in the Figures wherein the unloader is suspended at substantially the central location within the silo are not new. Therefore, the description of the construction of the silo unloader will be general with the improvement of the invention being described in greater detail.

Typically, the silo unloader 16 is suspended by a cable 18 which passes over pulleys 20 and 22 and wraps around a cable drum 24. The pulley 20 is suspended substantially at the peak of the silo 10 by means of gable members 26 and 28. The cable drum 24 is driven by an electric motor 30 which is connected by a belt 32 with a gearbox 34 for the drum 24.

The cable 18 supports a central support collar assembly and electrical slip ring 36. The assembly 36 supports a material blower 37 which connects with a silage spout 38. Spout 38 directs the discharged silage or bulk material through an appropriate discharge opening 14. A guide rail 40 cooperates with the opening 14 to align the spout 38 through the opening 14.

A pair of augers 42 and 44 are mounted on an auger frame 45. The augers 42 and 44 are driven by a motor A1 in FIG. 4 for the blower 37. Frame 45 is connected to the assembly 36 and extends from suspended cable 18 and assembly 36 at the center of the silo 10 to the wall of the silo 10. The outer end of the frame 45 includes wheels 46 and 48 which ride on the interior of the silo wall. It is important to note that the augers 42 and 44 are supported only at the middle of the silo 10 and thus the outer ends of the augers 42 and 44 may lie in a horizontal plane different from that of the inner or central end of the augers 42 and 44. The augers 42 and 44 are driven by a 230 v. motor 41 as shown in FIG. 4.

Figure 2:
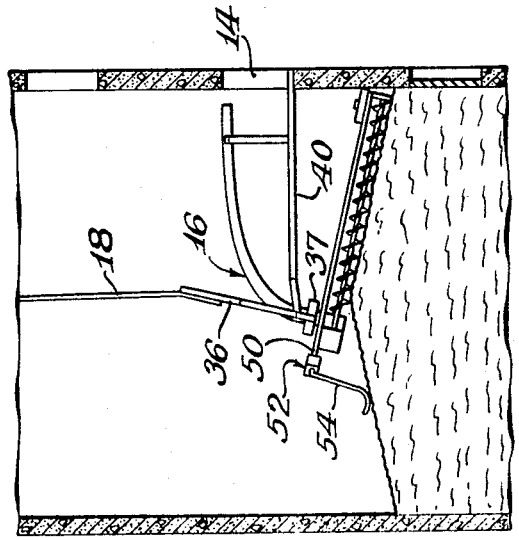
FIG. 2 is a cross-sectional view of the type shown in FIG. 1 wherein the material in the silo is distributed to define an inverted conical shape.

Extending in the opposite direction from the center or central location in the silo 10 and mounted on a support frame member 50 is a sensing and control means 52. Sensing and control means 52 is adapted to sense the profile of the bulk material within the silo 10. The profile is, of course, determined by the path that the augers 44 and 42 sweep as they traverse the interior of the silo as well as the type of bulk material. In practice then, the augers 42 and 44 will be suspended at the central location and will traverse a circular path about that location. As the augers 42 and 44 rotate they move material to the central location, where it is discharged through spout 38. This causes a cone-shape material profile to form as material is depleted in the region adjacent the walls of the silo. FIG. 2 illustrates this profile. The sensing and control means 52 is adjusted to sense the profile of the bulk material 12 and when the silage or material 12 achieves a cone shape, for example, as shown in FIG. 2, a switch which comprises a part of the control means 52 causes the motor 30 to operate thereby letting out the cable 18 and consequently lowering the silo unloader 16.

It is important to note that the sensing and control means 52 extend in a direction opposite that of the augers 42 and 44 and include a sensing foot 54 adapted to engage the surface of the material in the silo 10. By extending in this particular direction, the control means 52 does not interfere with the operation of the augers 42 and 44 and vice versa. Silage or other material will not be thrown up to interfere with the control means. In addition, the control means senses the material profile within the silo after the augers 42 and 44 have swept a path about the central location. This promotes a smooth and more gradual operation by the silo unloader 16.

Another feature of the invention is illustrated in FIG. 3. That is, the foot 54 is adapted to be substantially tangent to a circle concentric with the axis of rotation of the augers 42 and 44 about the central location in the silo. This feature enables the foot 54 to provide the least resistance in its travel about the axis of rotation of the unloader within the silo. The shape of the foot 54 may also be varied depending upon the type of bulk material in the silo. For example, the foot 54 may be nothing more than an arcuate rod as illustrated in FIG. 4 for some materials. On the other hand, for use with another type of material a broad, arcuate foot 54 may be necessary to ride over the surface of the material.

Referring now to FIG. 4, there is shown a schematic circuit diagram for the invention. Like components in FIG. 4 are numbered with the same numbers as the components set forth in FIGS. 1, 2 and 3. Lines 56, 57 and 58 are three phase power supply lines, line 58 being ground. Line 58 is connected to one side of the 115v. motor 30. The other side of motor 30 is connected to line 57 through a limit switch 60. A fuse 61 and circuit breaker 63 are provided for protection and control of the motor 30.

Switch 60 is operated by the foot or surface-sensing lever 54. Lever 54 is mounted for pivotal rotation on a shaft 62. The shaft 62 is, of course, fixed to the support frame member 50 illustrated in FIGS. 1 and 2. A cam 64 is attached to the lever 54 and mounted for coincident rotation therewith on shaft 62. Cam 64 is adapted to engage an actuation arm 66 of the limit switch 60. Cam 64 is arcuate in shape except for a flat portion 68. Whenever the foot 54 rotates about the shaft 62 so that the flat portion 68 engages the lever 66, the circuit is completed through to the motor 30. This initiates operation of motor 30 and lowers the cable 18. When the foot 54 rotates about the shaft 62 so that the arcuate portion of the cam 64 engages the lever 66, the circuit to the motor 30 is broken and the cable 18 remains substantially stationary.

The shape of the cam 64 may be varied so that the material profile in the silo can be controlled in substantially any desired way. Thus for granular materials like grain it is more likely to provide a horizontal material profile within the silo. In that event, the cam 64 is altered to initiate lowering of the cable 18 whenever the augers 42 and 44 vary from horizontal. On the other hand, with a rough material like silage, a substantially cone shaped material profile may be formed before the silo unloader is lowered. FIG. 2 illustrates this profile.

What we claim is:

1. In a device for removing silage or other similar material from a storage building, said material being removed from the top so as to define a material distribution profile, said device including material conveyor means for transporting said material at the top to a central location in said building, said material conveyor means being supported at an inner end by suspension means substantially at said central location, said conveyor means extending radially from said central location towards the walls of said building and terminating at an outer end; the improvement comprising control means attached to said conveyor means at the central location and extending substantially radially in the opposite direction from said conveyor means, said control means including switch means for control of said suspension means and operative to lower said material conveyor whenever said distribution profile is altered to actuate said control means.

2. The improved device of claim 1 wherein said material conveyor comprises at least one auger adapted to travel in a circular path about said central location to deliver material continuously to means for discharge of material from said building and wherein said control means includes a foot suspended to contact said material and sense the material profile.

3. The improved device of claim 2 wherein said foot is substantially tangent to a circle concentric with said central location.

UNITED STATES PATENT OFFICE
CERTIFICATE OF CORRECTION

Patent No. 3,596,783             Dated August 3, 1971

Inventor(s) Donald M. DeBower and Peter M. Warfield

It is certified that error appears in the above-identified patent and that said Letters Patent are hereby corrected as shown below:

In the heading of the printed patent, on the face page thereof, in line "[22]" showing the filing date, change "Dec. 5, 1970" to -- Jan. 5, 1970 --.

Signed and sealed this 11th day of January 1972.

(SEAL)
Attest:

EDWARD M. FLETCHER, JR.          ROBERT GOTTSCHALK
Attesting Officer                   Acting Commissioner of Patents